US012798547B2

(12) United States Patent
Terai et al.

(10) Patent No.: US 12,798,547 B2
(45) Date of Patent: Nov. 17, 2026

(54) VEHICLE AND METHOD OF DETERMINING ERROR FOR TRANSMISSION

(71) Applicant: KAWASAKI MOTORS, LTD., Akashi (JP)

(72) Inventors: Shohei Terai, Akashi (JP); Katsuya Sano, Akashi (JP); Katsuya Takagi, Kobe (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 55 days.

(21) Appl. No.: 18/987,675

(22) Filed: Dec. 19, 2024

(65) Prior Publication Data

US 2025/0214562 A1 Jul. 3, 2025

(30) Foreign Application Priority Data

Dec. 28, 2023 (JP) ................................ 2023-223256

(51) Int. Cl.
*B60W 20/10* (2016.01)
*B60W 10/02* (2006.01)
(Continued)

(52) U.S. Cl.
CPC ............ *B60W 20/10* (2013.01); *B60W 10/02* (2013.01); *B60W 10/06* (2013.01); *B60W 10/08* (2013.01);
(Continued)

(58) Field of Classification Search
CPC ...... B60W 10/02; B60W 10/06; B60W 10/08; B60W 10/023; B60W 10/11;
(Continued)

(56) References Cited

U.S. PATENT DOCUMENTS 6,345,216 B1 * 2/2002 Morimoto ............ B60W 10/06 477/7
9,944,278 B2 * 4/2018 Kitahata ................. B60K 6/26
(Continued)

FOREIGN PATENT DOCUMENTS

JP 202212620 A 1/2022

*Primary Examiner* — Brandon Z Willis
(74) *Attorney, Agent, or Firm* — Wenderoth, Lind & Ponack, L.L.P.

(57) ABSTRACT

A vehicle according to one aspect includes processing circuitry. The processing circuitry determines whether or not state information received from the transmission state detector is neutral information. After the processing circuitry determines that the state information is the neutral information, the processing circuitry controls the electric motor such that the electric motor generates predetermined determination torque. The processing circuitry determines based on rotation information received from the rotation information detector whether or not there is an error in the neutral information. When the processing circuitry determines that there is no error in the neutral information, the processing circuitry permits engine start control of transmitting power from the electric motor to the internal combustion engine to start the internal combustion engine. When the processing circuitry determines that there is the error in the neutral information, the processing circuitry restricts the engine start control.

13 Claims, 5 Drawing Sheets

(51) Int. Cl.
*B60W 10/06* (2006.01)
*B60W 10/08* (2006.01)
*B60W 50/02* (2012.01)
*F02N 11/08* (2006.01)

(52) U.S. Cl.
CPC ..... *B60W 50/0205* (2013.01); *F02N 11/0859* (2013.01); *B60W 2510/1035* (2013.01); *B60W 2710/083* (2013.01)

(58) Field of Classification Search
CPC .... B60W 10/111; B60W 20/10; B60W 20/40; B60W 20/50; B60W 30/02; B60W 30/18054; B60W 30/18181; B60W 30/192; B60W 50/0205; B60W 50/0225; B60W 50/038; B60W 2050/0295; B60W 2050/146; B60W 2510/02; B60W 2510/0208; B60W 2510/0657; B60W 2510/081; B60W 2510/083; B60W 2510/1005; B60W 2510/101; B60W 2510/1015; B60W 2510/1025; B60W 2510/1035; B60W 2510/105; B60W 2510/104; B60W 2510/106; B60W 2510/1065; B60W 2520/04; B60W 2520/28; B60W 2520/30; B60W 2710/083; B60W 2710/021; B60W 2710/086; B60W 2710/0666; B60W 2710/0677; B60W 2300/36; Y02T 10/62; B60K 6/20; B60K 6/387; B60K 2006/268; B60K 2006/4825; B60K 2006/4833; B60Y 2400/77; F02N 11/0859; G05D 17/02
See application file for complete search history.

(56) References Cited

U.S. PATENT DOCUMENTS

| | | | | |
|---|---|---|---|---|
| 2016/0023646 A1* | 1/2016 | Nedorezov | B60W 50/14 | 180/65.265 |
| 2018/0010685 A1* | 1/2018 | Yuasa | F16H 61/16 | |
| 2022/0001736 A1 | 1/2022 | Matsuda | | |
| 2023/0271602 A1* | 8/2023 | Nakano | B60K 6/48 | 701/22 |

* cited by examiner

VEHICLE AND METHOD OF DETERMINING ERROR FOR TRANSMISSION

CROSS-REFERENCE TO RELATED APPLICATIONS

This application claims priority to and the benefit of Japanese Patent Application No. 2023-223256 filed on Dec. 28, 2023, the entire disclosure of which is incorporated herein by reference.

BACKGROUND OF THE INVENTION

Field of the Invention

The present disclosure relates to a vehicle and a method of determining an error for a transmission.

Description of the Related Art

Japanese Laid-Open Patent Application Publication No. 2022-12620 discloses a hybrid vehicle including: an internal combustion engine and an electric motor as traveling driving sources; and a gear transmission. The start of the internal combustion engine is controlled by an integrated starter generator (ISG).

In various vehicles, such as hybrid vehicles, it is desirable that the number of parts be small. For example, the hybrid vehicle disclosed in Japanese Laid-Open Patent Application Publication No. 2022-12620 requires a motor for starting the engine in addition to the electric motor for driving, and also requires a sensor for starting the engine. Moreover, not only in the hybrid vehicles but also in various vehicles, it is desirable that the number of sensors mounted be as small as possible.

SUMMARY OF THE INVENTION

A vehicle according to one aspect of the present disclosure includes: an internal combustion engine and an electric motor as traveling driving sources; a driving wheel; a transmission including an input shaft to which power from the internal combustion engine and the electric motor is input and an output shaft that outputs the power to the driving wheel; a transmission state detector that detects state information related to a state of the transmission; a rotation information detector that is included separately from the transmission state detector and detects rotation information related to relative rotation between the input shaft and the output shaft; and a controller including processing circuitry, wherein: the processing circuitry determines whether or not the state information received from the transmission state detector is neutral information indicating that the transmission is in a neutral state where power transmission between the input shaft and the output shaft is cut; after the processing circuitry determines that the state information is the neutral information, the processing circuitry controls the electric motor such that the electric motor generates predetermined determination torque; the processing circuitry determines based on the rotation information received from the rotation information detector whether or not there is an error in the neutral information; when the processing circuitry determines that there is no error in the neutral information, the processing circuitry permits engine start control of transmitting the power from the electric motor to the internal combustion engine to start the internal combustion engine; and when the processing circuitry determines that there is the error in the neutral information, the processing circuitry restricts the engine start control.

A method of determining an error for a transmission according to one aspect of the present disclosure is a method of determining an error for a transmission including an input shaft to which power is input from a driving source and an output shaft that outputs the power to a driving wheel, the method including: by processing circuitry, acquiring state information indicating a state of the transmission; determining whether or not the state information is neutral information indicating that the transmission is in a neutral state where power transmission between the input shaft and the driving wheel is cut; when the processing circuitry determines that the state information is the neutral information, acquiring rotation information related to relative rotation between the input shaft and the output shaft by torque applied to the input shaft or the output shaft; and determining based on the rotation information whether or not there is an error in any one of the state information and the rotation information.

The above object, other objects, features, and advantages of the present disclosure will be made clear by the following detailed explanation of preferred embodiments with reference to the attached drawings.

DETAILED DESCRIPTION

Hereinafter, an embodiment will be described with reference to the drawings.

Configuration of Vehicle

Figure 1:
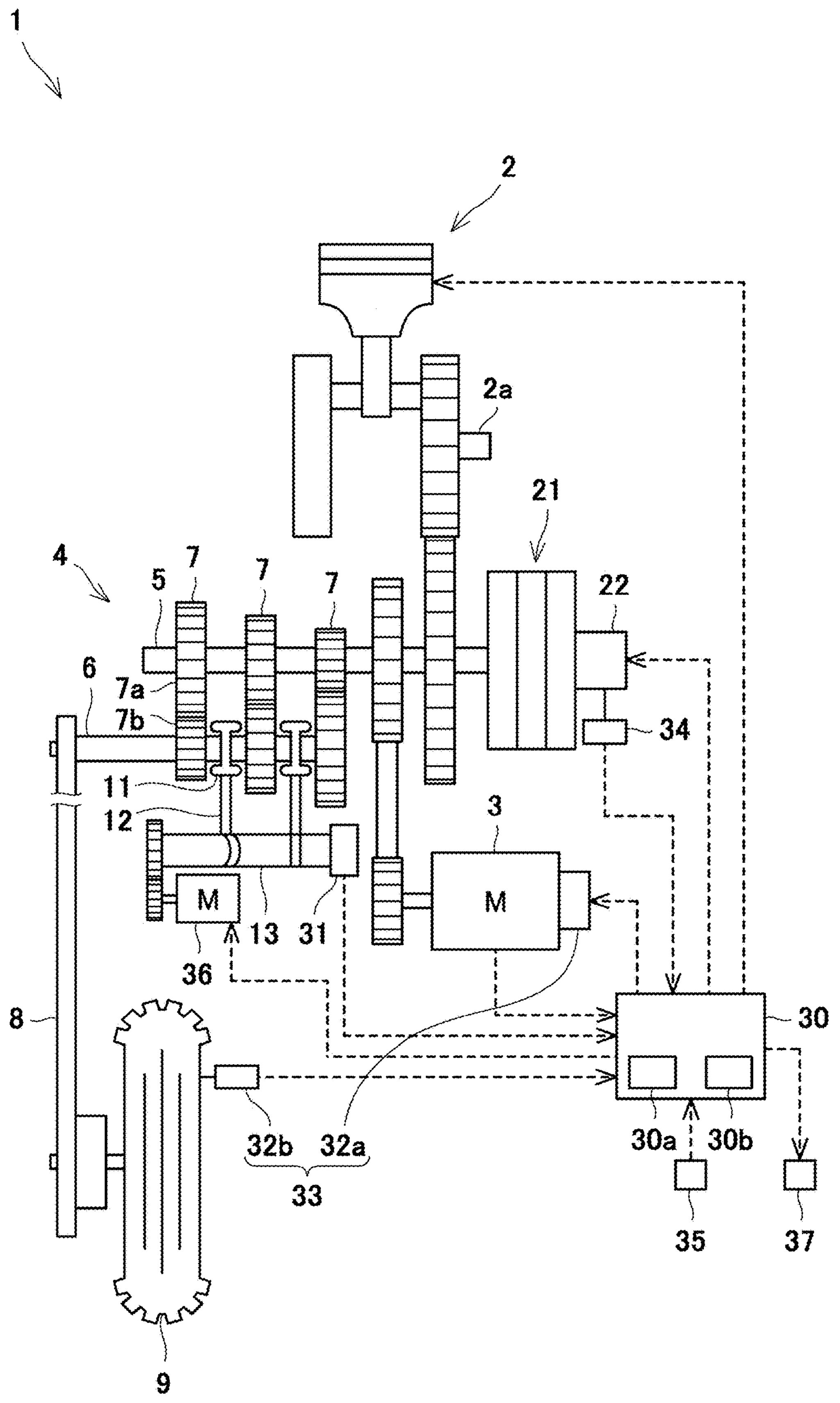
FIG. 1 is a schematic diagram of a vehicle according to one embodiment.

FIG. 1 is a schematic diagram of a vehicle 1 according to one embodiment. In the present embodiment, the vehicle 1 is a motorcycle including: a rear wheel as a driving wheel 9; and a front wheel as a driven wheel. The vehicle 1 may be a three-wheeled vehicle or a four-wheeled vehicle.

The vehicle 1 described in the present embodiment is a hybrid vehicle. As two traveling driving sources that generate torque for driving the driving wheel 9, the vehicle 1 includes an internal combustion engine (hereinafter simply referred to as an "engine") 2 and an electric motor 3. In the present embodiment, the vehicle 1 can switch among three different traveling modes. Specifically, the vehicle 1 selectively switches among an EG mode in which the driving wheel 9 is rotated only by the engine 2, an EV mode in which the driving wheel 9 is rotated only by the electric motor 3, and a HEV mode in which the driving wheel 9 is rotated by both of the engine 2 and the electric motor 3.

The vehicle 1 includes a transmission 4. The transmission 4 changes the speed of rotational power output from the traveling driving source. In the present embodiment, the transmission 4 can select change gear ratios. In the present embodiment, the transmission 4 is a constant mesh transmission. The transmission 4 includes an input shaft 5, an output shaft 6, and transmission gear pairs 7 whose change gear ratios are different from each other. The input shaft 5 and the output shaft 6 are parallel to each other. Power is input from the engine 2 and the electric motor 3 to the input shaft 5. The output shaft 6 transmits the power to the driving wheel 9 through a power transmitting structure 8. For example, the power transmitting structure 8 is a drive chain, a drive belt, a drive shaft, or the like.

The transmission 4 is a dog clutch gear transmission. Each of the transmission gear pairs 7 includes: a gear 7*a* supported by the input shaft 5; and a gear 7*b* supported by the output shaft 6. In the present embodiment, these two gears 7*a* and 7*b* of the transmission gear pair 7 mesh with each other at all times. The gear 7*a* that is coaxial with the input shaft 5 is fitted to the input shaft 5 so as to rotate together with the input shaft 5. The gear 7*b* that is coaxial with the output shaft 6 is rotatably inserted into the output shaft 6 so as to idle relative to the output shaft 6. Dog rings 11 are fitted to the output shaft 6 so as to rotate together with the output shaft 6 and be movable in an axial direction.

Each of the dog rings 11 is connected to a shift drum 13 by a shift fork 12. The transmission 4 is configured such that the shift fork 12 moves along the output shaft 6 by the rotation of the shift drum 13, and therefore, one of the gears 7*b* can be engaged with the dog ring 11. Specifically, a dog of the dog ring 11 which projects in an extending direction of the output shaft 6 enters into an engagement hole of the gear 7*b*. Thus, the gear 7*b* which has been engaged with the dog ring 11 rotates together with the output shaft 6, and the transmission gear pair 7 including this gear 7*b* is selected as a power transmitting path.

Moreover, when the shift fork 12 moves along the output shaft 6 by the rotation of the shift drum 13, each dog ring 11 can move to a neutral position at which the dog ring 11 is separated from all of the gears 7*b* (see FIG. 1). As above, the transmission 4 becomes a neutral state when all of the dog rings 11 reach the neutral positions. To be specific, when all of the dogs of the dog rings 11 are disengaged from the gears 7*b*, the transmission 4 becomes a state where power transmission between the input shaft 5 and the output shaft 6 is cut. The neutral state is a state where the transmission gear pairs 7 are not selected. In other words, the neutral state is a state where the dogs are not engaged with the gears. The dog rings 11 move along the output shaft 6 by torque generated by a below-described shift actuator 36.

A main clutch 21 is located between the engine 2 and the transmission 4. The main clutch 21 is switchable between an engaged state where the power transmitting path between the engine 2 and the input shaft 5 of the transmission 4 is established and a disengaged state where the power transmitting path is cut. The main clutch 21 is a friction clutch, such as a multiple disc clutch. The main clutch 21 is operated by a clutch actuator 22.

The main clutch 21 serves as a mode switcher that switches the traveling mode. Specifically, the vehicle 1 can travel in the EV mode when the main clutch 21 is in the disengaged state, and the electric motor 3 is driven. Moreover, the vehicle 1 can travel in the EG mode when the main clutch 21 is in the engaged state, the engine 2 is driven, and the electric motor 3 is stopped. Furthermore, the vehicle 1 can travel in the HEV mode when the main clutch 21 is in the engaged state, the engine 2 is driven, and the electric motor 3 is driven.

Moreover, when the engine 2 is in a stop state, and the main clutch 21 is in the engaged state, the rotational power from the electric motor 3 can be transmitted to a crankshaft 2*a*. Thus, the crankshaft 2*a* is rotated by the electric motor 3, and this realizes the engine start. Therefore, in the present embodiment, the vehicle 1 includes the electric motor 3 for driving, but does not include a starter motor dedicated for the engine start or a starter generator motor dedicated for the engine start and charging.

The vehicle 1 includes a controller 30. The controller 30 may be a single control unit or may be control units located distributedly. In terms of hardware, the controller 30 includes at least one CPU 30*a*, at least one memory 30*b*, an I/O interface, and the like. The at least one memory 30*b* includes a volatile memory and a non-volatile memory. A combination of the CPU 30*a* and the memory 30*b* is one example of processing circuitry.

A transmission state detector 31, a rotation information detector 33, a clutch state detector 34, and an operation detector 35 are electrically connected to the controller 30.

The transmission state detector 31 detects state information related to the state of the transmission 4. More specifically, the transmission state detector 31 detects information which is correlated to the state of the transmission 4 and can be utilized for the estimation of the state of the transmission 4. Specifically, the transmission state detector 31 detects state information indicating a selected state of the transmission gear pairs 7. In other words, the transmission state detector 31 detects a selected one of the gear stages.

The gear stages include a neutral stage and traveling gear stages. A state where the neutral stage is selected is the above-described neutral state. A state where the traveling gear stage is selected is a state where the transmission gear pair 7 corresponding to the traveling gear stage is selected as the power transmitting path from the transmission gear pairs 7. In the present embodiment, the traveling gear stages include first to sixth gear stages. However, the number of traveling gear stages may be less than six or may be more than six.

The transmission state detector 31 detects a parameter that is different from the rotating state of the input shaft 5 and the rotating state of the output shaft 6. The transmission state detector 31 may include at least one sensor. In the present embodiment, the transmission state detector 31 is a gear position sensor that detects a rotation angle of the shift drum 13. The gear position sensor may be realized by an angle sensor using a rotary encoder or a hall IC sensor. Since the rotation angle of the shift drum 13 and the gear stage correspond to each other, the selected one of the gear stages can be specified from the rotation angle of the shift drum 13. The state information related to the state of the transmission 4 may include information which is different from below-described rotation information detected by the rotation information detector 33 and based on which it can be determined whether or not the transmission 4 is in the neutral state.

The transmission 4, the transmission state detector 31, and the shift actuator 36 which are related to the speed change constitute a speed change system.

The rotation information detector 33 detects the rotation information related to relative rotation between the input shaft 5 and the output shaft 6 in the transmission 4. More specifically, the rotation information detector 33 detects information which is correlated to the relative rotation and can be utilized for the estimation of the relative rotation, i.e., the estimation regarding whether or not one of the input shaft 5 and the output shaft 6 is rotating relative to the other. For example, when one of the input shaft 5 and the output shaft 6 is in a stop state, the rotation information detector 33 may acquire information related to the rotation of the other.

The rotation information detector 33 may include at least one sensor. In the present embodiment, the rotation information detector 33 includes an input rotation sensor 32*a* and an output rotation sensor 32*b*. The input rotation sensor 32*a* detects input rotation information related to the rotation of the input shaft 5, and the output rotation sensor 32*b* detects output rotation information related to the rotation of the output shaft 6. To be specific, in the present embodiment, the rotation information includes the input rotation information and the output rotation information. The input rotation information may include at least information indicating whether or not the input shaft 5 is rotating. The output rotation information may include at least information indicating whether or not the output shaft 6 is rotating.

In the present embodiment, as the input rotation information, the input rotation sensor 32*a* detects the rotational speed of the input shaft 5 or the rotational speed of a rotating body that rotates in association with the input shaft 5. For example, the input rotation sensor 32*a* is a motor rotational frequency sensor that detects the rotational frequency of the electric motor 3 that rotates in association with the rotation of the input shaft 5 through a chain or the like. For example, the input rotation sensor 32*a* is located inside a housing of the electric motor 3. However, the input rotation sensor 32*a* is not limited to the motor rotational frequency sensor and may be a sensor that acquires information which is correlated to the rotation of the input shaft 5. For example, the input rotation sensor 32*a* may directly detect the rotational frequency of the input shaft 5.

In the present embodiment, as the output rotation information, the output rotation sensor 32*b* detects the rotational speed of the output shaft 6 or the rotational speed of a rotating body that rotates in association with the output shaft 6. For example, the output rotation sensor 32*b* is a wheel rotational speed sensor that detects the rotational speed of the driving wheel 9 that rotates in association with the rotation of the output shaft 6 through the power transmitting structure 8. However, the output rotation sensor 32*b* is not limited to the wheel rotational speed sensor and may be a sensor that acquires information which is correlated to the rotation of the output shaft. For example, the output rotation sensor 32*b* may directly detect the rotation (rotational speed, for example) of the output shaft 6. Moreover, for example, the output rotation sensor 32*b* may be a GPS sensor, a gyro sensor, or the like which estimates the movement of the position of the vehicle, the traveling speed of the vehicle, or the traveling acceleration of the vehicle.

The clutch state detector 34 detects the state of the main clutch 21. For example, the clutch state detector 34 detects clutch information indicating whether the main clutch 21 is in the engaged state or the disengaged state. The clutch state detector 34 may include at least one sensor. The clutch state detector 34 is realized by a pressure sensor that detects the pressure of a hydraulic chamber of the clutch actuator 22. In the present embodiment, when the main clutch 21 is in a natural state where the pressure is not applied to the hydraulic chamber, the clutch state detector 34 determines that the main clutch 21 is in the disengaged state. In other words, when the pressure of the hydraulic chamber is a value smaller than spring pressure, the clutch state detector 34 determines that the main clutch 21 is in the disengaged state.

The operation detector 35 detects the operation of an operation element operated by a rider. The operation detector 35 includes at least one operation element sensor. The operation element sensor is realized by: an accelerator sensor that detects an operation amount of an accelerator operation element operated by the rider; a brake sensor that detects an operation amount of a brake operation element operated by the rider; a shift sensor that detects a speed change operation of the rider with respect to a speed change operation element; and a mode switch sensor that detects a traveling mode switch operation of the rider with respect to a mode switch operation element. In addition, the operation element sensor may be a sensor, such as a stand sensor that detects a stand operation, which detects an operation amount of another existing operation element.

The engine 2 (more specifically, throttle equipment, an ignition plug, and a fuel injector), the electric motor 3, the clutch actuator 22, the shift actuator 36, and an informer 37 are electrically connected to the controller 30. The CPU 30*a* of the controller 30 controls the engine 2, the electric motor 3, the clutch actuator 22, the shift actuator 36, and the informer 37 based on information received from various detectors, such as the transmission state detector 31, the rotation information detector 33, the clutch state detector 34, and the operation detector 35.

For example, the CPU 30*a* controls the engine 2, the electric motor 3, the clutch actuator 22, and the shift actuator 36 in accordance with the traveling mode of the vehicle 1. For example, the CPU 30*a* switches the traveling mode of the vehicle 1 among the EV mode, the HEV mode, and the EG mode based on information received from the above-described mode switch sensor that detects the traveling mode switch operation of the rider. For example, even when there is no traveling mode switch operation of the rider, the CPU 30*a* may switch the traveling mode of the vehicle 1 based on information received from various sensors included in the vehicle 1.

The clutch actuator 22 is controlled by the controller 30 to operate the main clutch 21. Specifically, the clutch actuator 22 sets the main clutch 21 to the engaged state or the disengaged state.

The clutch actuator 22 is, for example, a hydraulic actuator and includes: the hydraulic chamber that stores oil (hereinafter may also be referred to as "clutch oil"); a piston that is driven by hydraulic pressure of the hydraulic chamber; a solenoid valve that adjusts the hydraulic pressure of the hydraulic chamber.

In the present embodiment, power transmitting torque can be made variable in such a manner that frictional force of the main clutch 21 is adjusted by adjusting the hydraulic pressure of the clutch actuator 22. The power transmitting torque can be stepwisely changed by stepwisely increasing or decreasing the hydraulic pressure of the clutch actuator 22. In the present embodiment, when the main clutch 21 is in the natural state where the hydraulic pressure is not applied to the main clutch 21, adjacent friction plates included in the main clutch 21 are separated from each other by a spring, and this prevents the power from being transmitted from the engine 2 to the input shaft 5. When the hydraulic pressure is gradually increased by the controller 30, the adjacent friction plates are pressed against each other against the spring, and this increases the torque that can be transmitted between a rotary member of the engine 2 and the input shaft 5.

The shift actuator 36 is controlled by the controller 30 to rotate the shift drum 13 and thereby move the dog rings 11. The shift actuator 36 is, for example, an electric motor.

The shift actuator 36 rotates the shift drum 13 in accordance with the speed change operation of the rider to change the state of the transmission 4. Specifically, the shift sensor included in the operation detector 35 detects the speed change operation of the rider with respect to the speed change operation element. The controller 30 controls the shift actuator 36 based on detection information transmitted from the shift sensor, to change the state of the transmission 4.

For example, when the rider performs the speed change operation of selecting the desired gear stage (i.e., the desired change gear ratio), the detection information of the shift sensor which corresponds to this gear stage is transmitted to the controller 30, and the controller 30 controls the shift actuator 36 such that the gear stage indicated by the detection information is selected.

For example, when the rider performs the speed change operation of selecting the neutral stage, the detection information of the shift sensor which corresponds to the neutral stage is transmitted to the controller 30, and the controller 30 controls the shift actuator 36 such that the transmission 4 becomes the neutral state. When the rider does not perform the speed change operation, but a predetermined condition is satisfied, the controller 30 may control the shift actuator 36 such that the transmission 4 becomes the neutral state.

The informer 37 is equipment that informs the rider that below-described engine start control is not started. Specifically, the informer 37 outputs engine start error information indicating that the engine start control is not started. The informer 37 may be part of an instrument panel of the vehicle 1. In the present embodiment, the informer 37 is a display that displays the engine start error information as image information.

Engine Start Related Control when Vehicle is in Stop State

Figure 2:
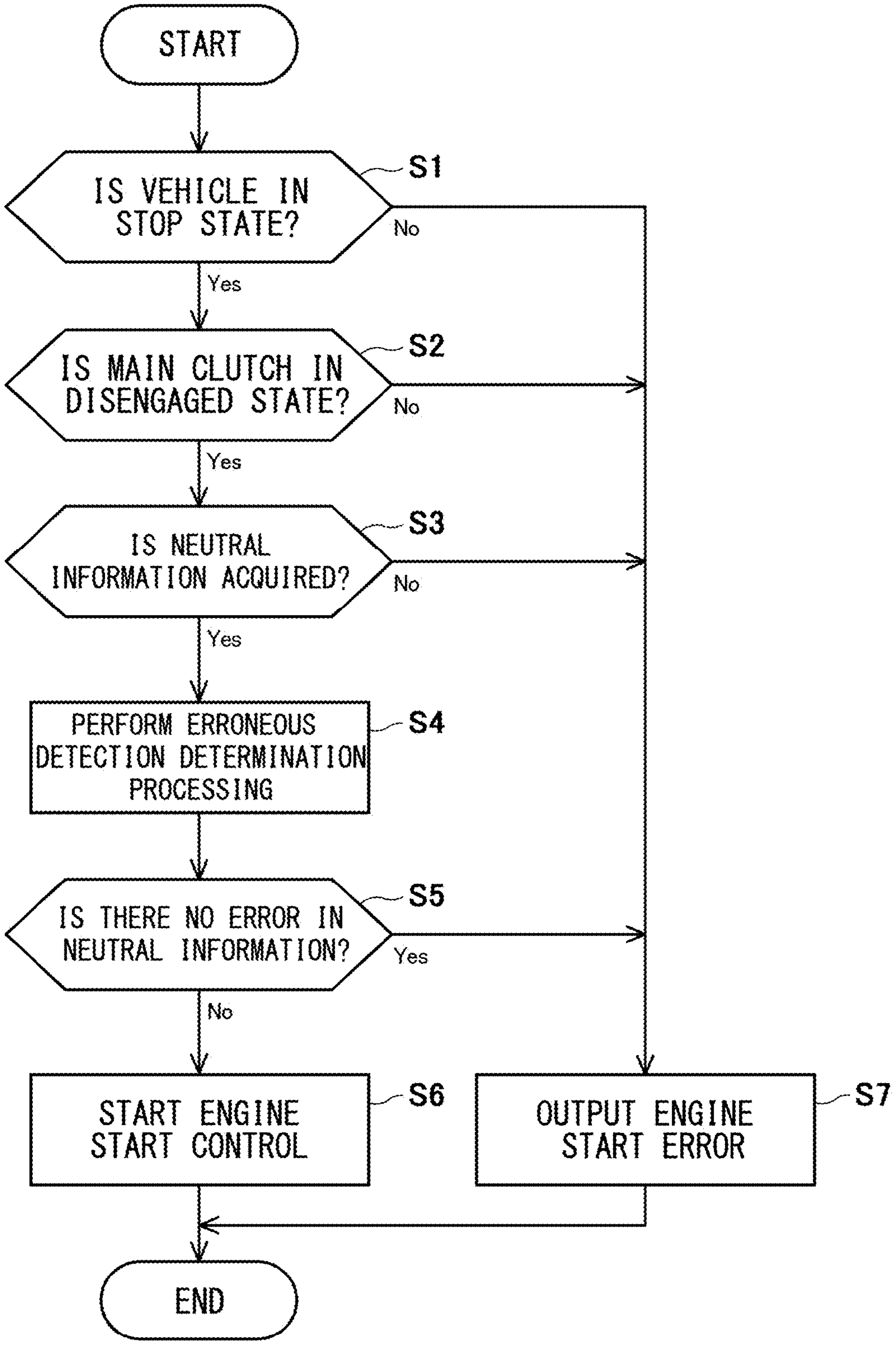
FIG. 2 is a flowchart showing the flow of engine start related control.
Figure 3:
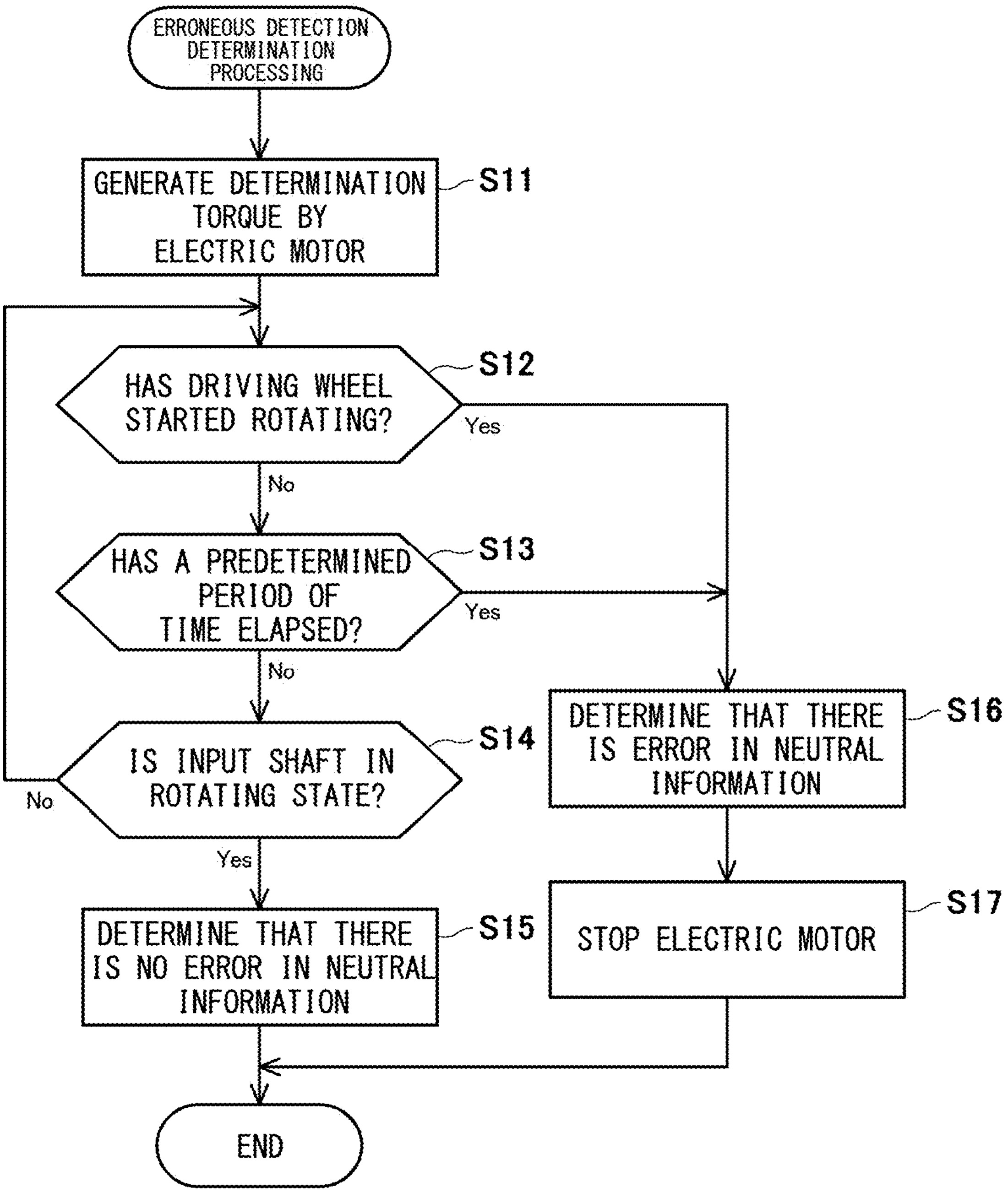
FIG. 3 is a flowchart showing the flow of erroneous detection determination processing that is part of the engine start related control.
Figure 4:
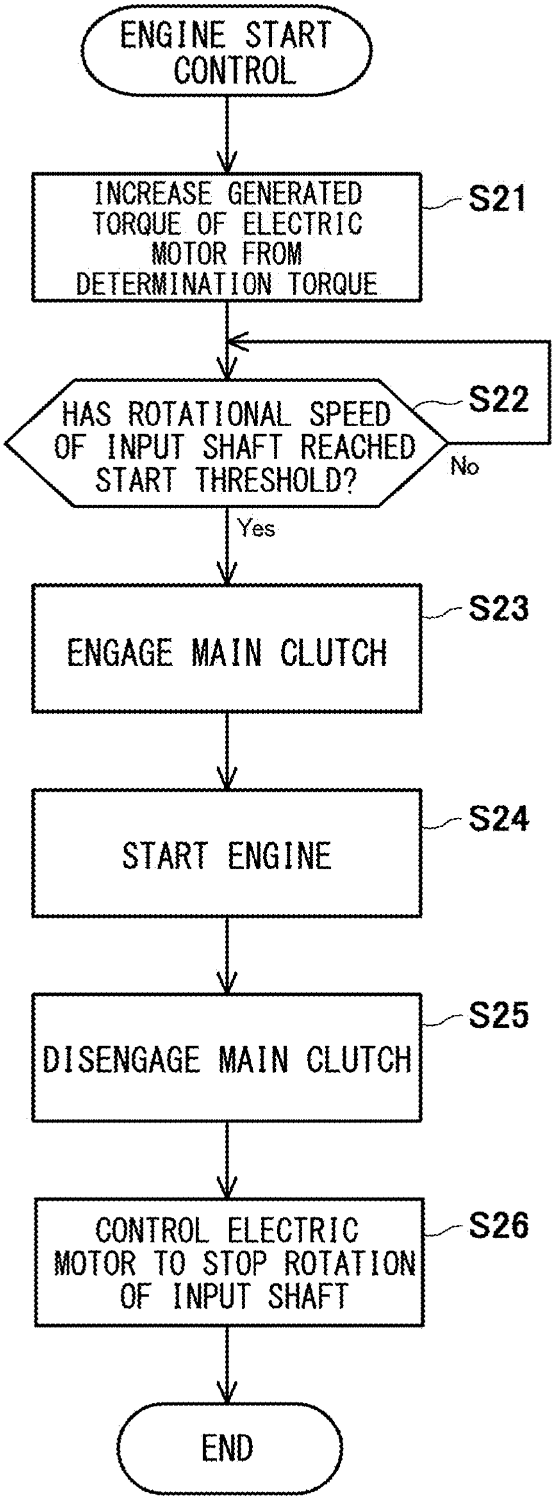
FIG. 4 is a flowchart showing the flow of engine start control that is part of the engine start related control.

FIG. 2 is a flowchart showing the flow of the engine start related control by the processing circuitry. The engine start related control is control for starting the engine 2 when the vehicle 1 is in the stop state. FIG. 3 is a flowchart showing the flow of erroneous detection determination processing that is part of the engine start related control. FIG. 4 is a flowchart showing the flow of the engine start control that is part of the engine start related control. The engine start related control is performed in such a manner that the CPU 30*a* executes an engine start related program stored in the memory 30*b*. The engine start related program includes: an erroneous detection determination program for executing the erroneous detection determination processing; and an engine start control program for executing the engine start control.

Figure 5:
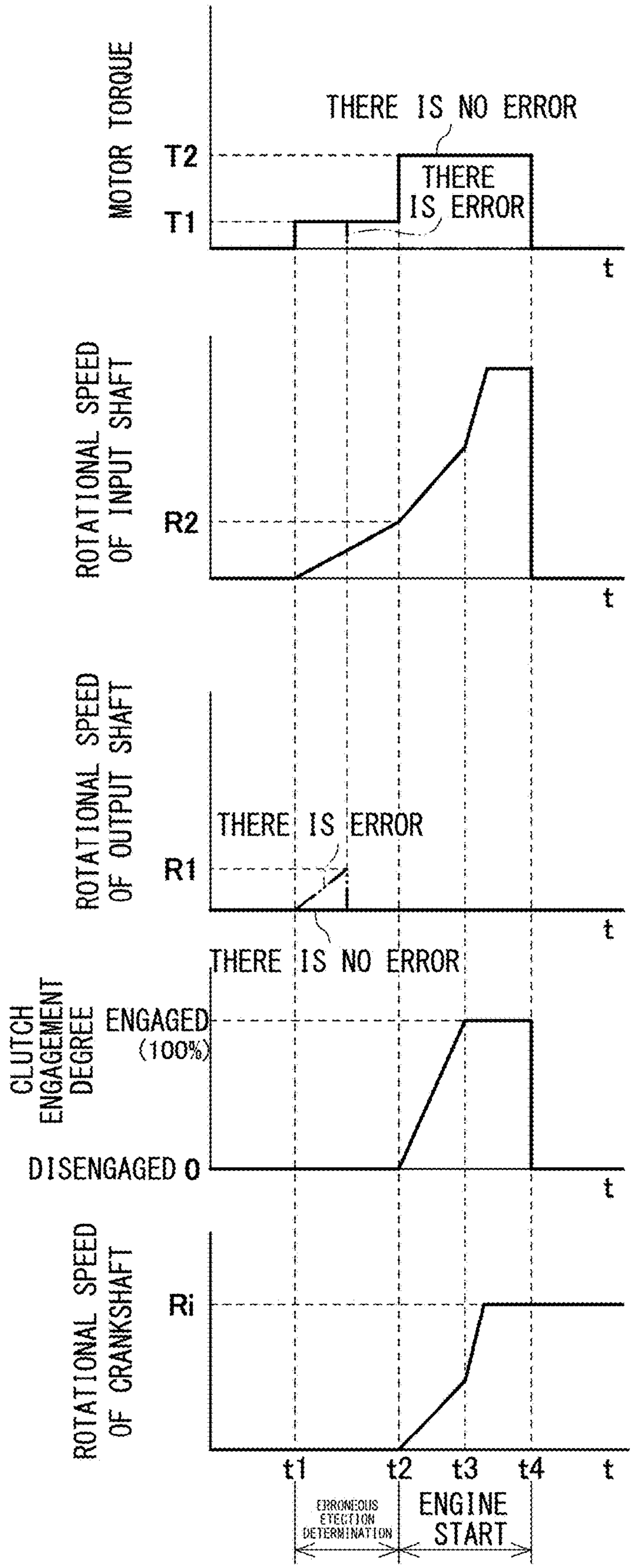
FIG. 5 shows graphs showing temporal transitions of various values at the time of the engine start related control.

FIG. 5 shows graphs showing temporal transitions of various values at the time of the engine start related control. FIG. 5 shows a graph showing motor torque that is generated torque of the electric motor, a graph showing the rotational speed of the input shaft 5, a graph showing the rotational speed of the output shaft 6, a graph showing a clutch engagement degree that is the degree of engagement of the main clutch 21, and a graph showing the rotational speed of the crankshaft 2*a* in this order from an upper side.

Each of the rotational speeds of the input shaft 5, the output shaft 6, and the crankshaft 2*a* is the speed of rotation of an object per unit time. For example, the rotational speed may be represented by an angle (i.e., an angular velocity) the object that advances per unit time or by the number of times of the rotation of the object per unit time.

Moreover, in the graphs of FIG. 5, the degree of engagement of the main clutch 21 is a parameter corresponding to the degree of power transmission between the engine 2 and the transmission 4. In the present embodiment, since the clutch actuator 22 is the hydraulic actuator, the degree of engagement of the main clutch 21 may correspond to the hydraulic pressure of the hydraulic chamber. For example, when the hydraulic pressure is preset minimum pressure (hereinafter referred to as "open corresponding pressure"), the degree of engagement of the main clutch 21 is 0%, and the main clutch 21 is in the disengaged state where the power is not transmitted from one of the crankshaft 2*a* of the engine 2 and the input shaft 5 to the other. Then, as the hydraulic pressure increases from the open corresponding pressure, the clutch engagement degree also increases. When the hydraulic pressure is preset maximum pressure (hereinafter referred to as "engagement corresponding pressure") or not less than the engagement corresponding pressure, the degree of engagement of the main clutch 21 is 100%, and the main clutch 21 is in the engaged state where the power is completely transmitted from one of the crankshaft 2*a* of the engine 2 and the input shaft 5 to the other.

Hereinafter, the flow of the engine start related control shown in FIG. 2 will be described with suitable reference to FIGS. 3, 4, and 5.

When the CPU 30*a* determines that a predetermined engine start condition is satisfied, the CPU 30*a* starts the engine start related control shown in FIG. 2. For example, the engine start condition may include a condition that the HEV mode or the EG mode has been selected as the traveling mode by the operation of the rider or by the traveling state of the vehicle. Moreover, for example, the engine start condition may be a condition that the state of the vehicle 1 has become such a state that it is difficult to continue the EV mode, for example, that the remaining amount of a battery storing electric power to be supplied to the electric motor 3 has decreased to a predetermined value or less.

When the CPU 30*a* determines that the engine start condition has been satisfied, the CPU 30*a* starts the engine start related control. In the engine start related control, the CPU 30*a* determines based on the output rotation information received from the output rotation sensor 32*b* whether or not the vehicle 1 is in the stop state (Step S1).

When the CPU 30*a* determines that the vehicle 1 is not in the stop state (No in Step S1), the CPU 30*a* determines that the vehicle state is such a state that the engine start is not permissible. Then, the CPU 30*a* proceeds to Step S7 of displaying an engine start error as described below.

When the CPU 30*a* determines that the vehicle 1 is in the stop state (Yes in Step S1), the CPU 30*a* determines based on the clutch information received from the clutch state detector 34 whether or not the main clutch 21 is in the disengaged state (Step S2). When a command for setting the main clutch 21 to the disengaged state has been transmitted from the controller 30 to the clutch actuator 22, the CPU 30*a* may estimate based on this command that the main clutch 21 is in the disengaged state.

When the CPU 30*a* determines that the main clutch 21 is not in the disengaged state (No in Step S2), the CPU 30*a* determines that the vehicle state is such a state that the engine start is not permissible. Then, the CPU 30*a* proceeds to Step S7 of displaying the engine start error as described below. When the CPU 30*a* determines that the main clutch 21 is not in the disengaged state, the CPU 30*a* may control the clutch actuator 22 such that the main clutch 21 becomes the disengaged state. When the main clutch 21 becomes the disengaged state, the CPU 30*a* may proceed to Step S3. When the main clutch 21 does not become the disengaged state or when the control of setting the main clutch 21 to the disengaged state is not permissible, the CPU 30*a* may proceed to Step S7.

When the CPU 30*a* determines that the main clutch 21 is in the disengaged state (Yes in Step S2), the CPU 30*a* determines whether or not the transmission 4 is in the neutral state. Specifically, the CPU 30*a* determines whether or not the state information received from the transmission state detector 31 is neutral information (Step S3).

When the CPU 30*a* determines that the state information is not the neutral information (No in Step S3), the CPU 30*a* determines that the vehicle state is such a state that the engine start is not permissible. Then, the CPU 30*a* proceeds to Step S7 of displaying the engine start error as described below. When the CPU 30*a* determines that the state information is not the neutral information, the CPU 30*a* may control the shift actuator 36 such that the transmission 4 becomes the neutral state. When the CPU 30*a* has transmitted to the shift actuator 36 a command value for setting the transmission 4 to the neutral state or when the CPU 30*a* has received the neutral information from the transmission state detector 31 after transmitting the above command value, the CPU 30*a* may proceed to Step S4. When the transmission 4 does not become the neutral state or when the control of setting the transmission 4 to the neutral state is not permissible, the CPU 30*a* may proceed to Step S7.

When the CPU 30*a* determines that the state information is the neutral information (Yes in Step S3), the CPU 30*a* executes the erroneous detection determination processing (Step S4). The erroneous detection determination processing is processing for determining based on the rotation information received from the rotation information detector 33 whether or not there is an error in the information received from the transmission state detector 31 or the rotation information detector 33. More specifically, the erroneous detection determination processing is processing of determining whether or not the transmission 4 is in the neutral state, separately from the detection result of the transmission state detector 31.

As shown in FIG. 3, in the erroneous detection determination processing, first, the CPU 30*a* controls the electric motor 3 to generate predetermined determination torque T1 (Step S11). The determination torque T1 is set to such minute torque that even if the transmission 4 is not in the neutral state, i.e., even if there is an error in the neutral information acquired in Step S3, the rider is not influenced as much as possible.

As shown in the graph of the motor torque in FIG. 5, the motor torque becomes the determination torque T1 at the start (t=t1) of the erroneous detection determination processing at which it is determined that the state information is the neutral information. As shown in the graph of the rotational speed of the input shaft in FIG. 5, when the transmission 4 is in the neutral state, the rotational speed of the input shaft 5 of the transmission 4 increases by the determination torque T1 generated by the electric motor 3 in a period from the start (t=t1) of the erroneous detection determination processing until the termination (t=t2) of the erroneous detection determination processing.

The determination torque T1 is set to a value smaller than below-described start torque T2. The present embodiment describes the control on the basis that the main clutch 21 is in the disengaged state, and the crankshaft 2*a* of the engine 2 does not have to be rotated by the determination torque T1. Therefore, it is preferable that the determination torque T1 be set to a value smaller than torque necessary to rotate the crankshaft 2*a* when the engine 2 is in the stop state.

Moreover, when the transmission 4 is in the neutral state, the determination torque T1 is set to torque that can rotate the input shaft 5 against transmission resistance force and inertial force of the gear pair in the power transmitting path from the electric motor 3 to the input shaft 5. Furthermore, when the transmission 4 is not in the neutral state, the determination torque T1 may be set to such torque that the rotation of the input shaft 5 is prevented by the transmission resistance force of the transmission 4 and the driving wheel 9. Moreover, the determination torque T1 may be set to torque smaller than braking torque generated when the rider operates the brake operation element. For example, when the determination torque T1 is converted into a value that is applied to the input shaft 5, the value may be set to 20 Nm or less, preferably 10 Nm or less. The determination torque T1 may change over time. Furthermore, the determination torque T1 may be set so as to change in accordance with the temperature of the clutch oil supplied into the clutch. Specifically, the clutch state detector 34 may include a temperature sensor that detects the temperature of the clutch oil, and the CPU 30*a* may set the determination torque T1 based on the temperature of the clutch oil which is detected by the temperature sensor. In this case, the determination torque T1 may be set so as to increase as the temperature of the clutch oil decreases.

Moreover, a period (hereinafter referred to as a "torque applied period") in which the determination torque T1 is applied may be predetermined. In this case, the torque applied period may be set to such a period that even if the transmission 4 is not in the neutral state, the vehicle is influenced little. For example, the torque applied period may be set to such a period that when the determination torque T1 is applied, the input shaft 5 rotates by a rotation angle that is smaller than a rotation angle corresponding to one rotation. In other words, the torque applied period may be set to such a period that if the main clutch 21 is in the engaged state, and the input shaft 5 rotates by the application of the determination torque T1, the crankshaft 2*a* rotates by a rotation angle that is smaller than a rotation angle corresponding to one rotation. Furthermore, the torque applied period may be set to such a period that if the transmission 4 is not in the neutral state, and the input shaft 5 rotates by the application of the determination torque T1, the input shaft 5 is angularly displaced beyond a minimum angular range that can be detected by the input rotation sensor 32*a* or the output rotation sensor 32*b*. For example, the torque applied period may be set to a period of time until the angular velocity of the input shaft 5 reaches 10.5 rad/s. The determination torque T1 may be applied until the rotational frequency of the input shaft 5 reaches 100 rpm. Moreover, the torque applied period may be set to a period of time until the angular velocity of the input shaft 5 is assumed to reach 10.5 rad/s, for example, 50 milliseconds or less.

Similarly, the angular velocity or angular acceleration of the input shaft 5 that rotates by the application of the determination torque T1 may be set to such a value that the vehicle is influenced little even if the transmission 4 is not in the neutral state. The angular velocity or angular acceleration of the input shaft 5 that rotates by the application of the determination torque T1 is set to a value smaller than the angular velocity or angular acceleration of the input shaft 5 that rotates by the application of the below-described start torque T2.

Referring back to FIG. 3, the CPU 30*a* determines based on the output rotation information received from the rotation information detector 33 whether or not the output shaft 6 has started rotating, i.e., whether or not the driving wheel 9 that rotates in association with the output shaft 6 has started rotating (Step S12). Whether or not the driving wheel 9 has started rotating may be determined by determining whether or not a detected value of the output rotation sensor 32*b* has exceeded a predetermined output determination threshold R1 (see a two-dot chain line in the graph of the rotational speed of the output shaft in FIG. 5). For example, the CPU 30*a* may determine whether or not the driving wheel 9 has rotated by a predetermined angle or more or may determine whether or not the driving wheel 9 has rotated at a predetermined angular velocity or predetermined angular acceleration.

For example, it is preferable that the above-described predetermined angle be set to 90° or less, more preferably 30° or less, further preferably 15° or less. Thus, the movement of the vehicle body in the erroneous detection determination processing can be suppressed. The predetermined angle may be set to an angle that exceeds the minimum angular range that can be detected by the output rotation sensor 32*b*. For example, the predetermined angle may be set to a value that is not less than twice the minimum angular range that can be detected by the output rotation sensor 32*b*. Thus, the erroneous detection caused due to the change in the posture of the rider straddling the vehicle can be prevented.

The CPU 30*a* counts an elapsed time since the control of the electric motor 3 which generates the determination torque T1 is started. When the CPU 30*a* determines that the driving wheel 9 has not started rotating (No in Step S12), the CPU 30*a* determines whether or not the elapsed time has reached a predetermined period of time (Step S13). The elapsed time may be an elapsed time since the start of the control of generating the determination torque T1 or may be an elapsed time since a predetermined time point after the start of the above control.

When the above-described torque applied period is preset, the predetermined period of time may be set equal to the torque applied period or may be set longer than the torque applied period. It is preferable that the predetermined period of time be set to such a period of time that even if the rotation of the electric motor 3 is prevented, the electric motor 3 is prevented from being damaged. Specifically, the predetermined period of time may be set to such a period of time that the electric motor 3 is prevented from being damaged by the flow of overcurrent through the electric motor 3.

Moreover, the CPU 30*a* determines based on the input rotation information whether or not the input shaft 5 is in a rotating state (Step S14). Whether or not the input shaft 5 is in the rotating state may be determined by determining whether or not a detected value of the input rotation sensor 32*a* is a predetermined input determination threshold R2 or more (see the graph of the rotational speed of the input shaft in FIG. 5). Specifically, the CPU 30*a* determines whether or not the rotational speed of the input shaft 5 is the predetermined input determination threshold R2 or more. The input determination threshold R2 is set as the rotational speed of the input shaft 5 which may be exceeded by the determination torque T1 transmitted from the electric motor 3. The input determination threshold R2 may be set as the angular velocity of the input shaft 5 or the rotational frequency of the input shaft 5. In Step S14, whether or not the input shaft 5 is in the rotating state may be determined. Therefore, the input determination threshold R2 may be a value larger than zero, and preferably, may be set to a value that is not less than twice the minimum angular range that can be detected by the input rotation sensor 32*a*. Thus, the erroneous detection caused due to the change in the posture of the rider straddling the vehicle can be prevented.

When the elapsed time has not reached the predetermined period of time (No in Step S13), and the rotational speed of the input shaft 5 has not reached the predetermined input determination threshold R2 (No in Step S14), the CPU 30*a* continuously monitors the rotating state of the driving wheel 9 in Step S12 and continuously monitors the rotating state of the input shaft 5 in Step S14. For example, the predetermined period of time set in Step S13 is set to 2,000 milliseconds. Moreover, for example, in Step S14, the CPU 30*a* may be able to determine whether or not the input shaft 5 in the transmission 4 is prevented from rotating since the input shaft 5 is in connection with the output shaft 6 that is not rotatable by, for example, braking with respect to the driving wheel. Therefore, the input determination threshold R2 is set to a relatively small value. Specifically, the input determination threshold R2 is set to 10.5 rad/s or less as the angular velocity of the input shaft 5, in other words, 100 rpm or less as the rotational frequency of the input shaft 5.

When the CPU 30*a* determines that the rotational speed of the input shaft 5 is the predetermined input determination threshold R2 or more (Yes in Step S14), the CPU 30*a* determines that there is no error in the neutral information (Step S15), and terminates the erroneous detection determination processing.

When the CPU 30*a* determines that the driving wheel 9 has started rotating (Yes in Step S12) or when the CPU 30*a* determines that the rotational speed of the input shaft 5 does not reach the input determination threshold R2, and the elapsed time has reached the predetermined period of time (Yes in Step S13), the CPU 30*a* determines that there is an error in the neutral information (Step S16). Then, the CPU 30*a* stops the generation of the determination torque T1 generated by the electric motor 3 (Step S17; see a two-dot chain line in the graph of the motor torque in FIG. 5) and terminates the erroneous detection determination processing.

When the CPU 30*a* determines in Step S12 that the driving wheel 9 has started rotating, the CPU 30*a* stops, in Step S17, the generation of the determination torque T1 generated by the electric motor 3. This can prevent the vehicle 1 from excessively moving by the generation of the determination torque T1. For example, when the torque applied period is preset, and the CPU 30*a* determines that the driving wheel 9 has started rotating before the period in which the determination torque T1 is applied reaches the preset torque applied period, the CPU 30*a* stops the electric motor 3. Thus, the movement of the vehicle can be quickly suppressed.

Moreover, when the CPU 30*a* determines in Step S12 that the driving wheel 9 has started rotating, the CPU 30*a* may generate the braking torque by using the electric motor 3 or brake equipment. Thus, the inertial movement of the vehicle is suppressed, and the movement of the vehicle can be further suppressed.

One example of a case of Yes in Step S13 is a case where: the transmission 4 is not in the neutral state; brake force is applied to the driving wheel 9 by the operation of the rider with respect to the brake operation element; and the brake force acts on the input shaft 5 from the output shaft 6.

Referring back to FIG. 2, when the CPU 30*a* determines as a result of the erroneous detection determination processing in Step S4 that there is no error in the neutral information (No in Step S5), the CPU 30*a* permits and starts the engine start control of transmitting the power from the electric motor 3 to the engine 2 to start the engine 2 (Step S6).

When the CPU 30*a* determines as a result of the erroneous detection determination processing in Step S4 that there is an error in the neutral information (Yes in Step S5), the CPU 30*a* outputs the engine start error information by using the informer 37 (Step S7). Specifically, the CPU 30*a* displays the engine start error information on the display that is the informer 37. After Step S7, the CPU 30*a* terminates the engine start related control without proceeding to the engine start control. In this case, when the CPU 30*a* receives a vehicle start command from the rider after the termination of the engine start related control, the CPU 30*a* starts the vehicle in the EV mode using the electric motor 3.

FIG. 4 is a flowchart showing the flow of the engine start control shown in Step S6 of FIG. 2. The CPU 30*a* starts the engine start control after the CPU 30*a* determines twice that the transmission 4 is in the neutral state, by using the neutral information received from the transmission state detector 31 and the result of the erroneous detection determination processing based on the rotation information received from the rotation information detector 33.

Specifically, the CPU 30*a* starts the engine start control while maintaining the neutral state of the transmission. The CPU 30*a* controls the electric motor 3 such that the generated torque of the electric motor 3 increases from the determination torque T1 (Step S21). This is because the start torque T2 necessary to start the engine 2 is larger than the determination torque T1. The start torque T2 is torque that increases the rotational frequency of the crankshaft 2*a* to a rotational frequency necessary to start the engine 2. As described above, the start torque T2 is set to torque that can rotate the crankshaft 2*a* against the inertial moment, compressive resistance, and rotational resistance of a rotary part of the engine 2. The CPU 30*a* controls the electric motor 3 to generate predetermined start torque. In the present embodiment, the CPU 30*a* controls the electric motor 3 to generate the start torque T2 such that the rotational frequency of the input shaft 5 becomes a predetermined start rotational frequency suitable for the engine start.

While increasing the generated torque of the electric motor 3, the CPU 30*a* determines based on the input rotation information whether or not the rotational speed of the input shaft 5 has reached a start threshold (Step S22). The start threshold is set to the input determination threshold R2 or more. The start threshold may be set to a rotational speed higher than the rotational speed of the input shaft 5 which has been converted into an idling rotational speed Ri of the engine 2.

When the CPU 30*a* determines that the rotational speed of the input shaft 5 has reached the start threshold (Yes in Step S22), the CPU 30*a* controls the clutch actuator 22 such that the main clutch 21 switches from the disengaged state to the engaged state (Step S23).

In the present embodiment, since the start threshold is set so as to coincide with the input determination threshold R2, the rotational speed of the input shaft 5 reaches the start threshold at the start (t=t2) of the engine start control. Therefore, in the present embodiment, as shown in FIG. 5, the control of the clutch actuator 22 in Step S23 starts from the start (t=t2) of the engine start control. In this case, Step S22 may be omitted. Moreover, even when the start threshold is not set so as to coincide with the input determination threshold R2, Step S22 may be omitted. The start threshold may not be set.

As shown in FIG. 5, in the control of the clutch actuator 22 in Step S23, it is preferable that the CPU 30*a* control the clutch actuator 22 so as to gradually increase the clutch engagement degree. In accordance with this, the power transmitted from the input shaft 5 of the transmission 4 to the crankshaft 2*a* through the main clutch 21 increases, and the rotational speed of the input shaft 5 increases (see a period from the time point t2 to the time point t3 in the graphs of FIG. 5).

Thus, the generated torque of the electric motor 3 is transmitted through the main clutch 21 to the crankshaft 2*a* of the engine 2 to rotate the crankshaft 2*a*. After that, the CPU 30*a* starts the ignition by the ignition plug of the engine 2 and the supply of the fuel by the fuel injector of the engine 2 to start the engine 2 (Step S24). To be specific, the CPU 30*a* generates the rotational power by the combustion of the fuel by the engine 2. In other words, the engine 2 generates the power that rotates the crankshaft 2*a*, by the combustion of the fuel. For simplicity, FIG. 5 shows a state where at the time point (t=t3) at which the clutch engagement degree becomes 100%, the fuel in the engine 2 is combusted, and the rotational speed of the input shaft 5 rapidly increases. However, the combustion of the fuel in the engine 2 may be performed before the clutch engagement degree reaches 100% or after the clutch engagement degree reaches 100%.

After the engine 2 starts, in other words, after the combustion of the fuel by the engine 2 starts, the CPU 30*a* controls the clutch actuator 22 such that the main clutch 21 switches from the engaged state to the disengaged state (Step S25).

Moreover, the CPU 30*a* controls the electric motor 3 so as to stop the rotation of the input shaft 5 (Step S26). Thus, undesired rotation of the input shaft 5 can be prevented. In Step S26, specifically, the CPU 30*a* may stop the electric motor 3. To be specific, the CPU 30*a* may stop the supply of the current to the electric motor 3 to set the generated torque of the electric motor 3 to zero. Instead, in Step S26, the CPU 30*a* may control the electric motor 3 such that the electric motor 3 generates negative torque that is torque acting in a direction opposite to the direction in which the input shaft 5 rotates. Thus, the rotation of the input shaft 5 may be actively reduced.

FIG. 5 shows that the control of the clutch actuator 22 in Step S25 and the control of the electric motor 3 in Step S26 are performed at the same time (see the time point t4 in FIG. 5). However, the control of the electric motor 3 in Step S26 may be performed after the main clutch 21 switches from the engaged state to the disengaged state.

When the rotation of the input shaft 5 is stopped after the engine 2 starts as above, the CPU 30*a* terminates the engine start control. When the start of the engine 2 is realized, the CPU 30*a* can control the engine 2, the clutch actuator 22, and the shift actuator 36 in accordance with, for example, the vehicle start operation of the rider to start the vehicle by using the power of the engine 2.

As described above, according to the present embodiment, whether or not there is an error in the neutral information is determined based on the rotation information by the erroneous detection determination processing. When the CPU 30*a* determines that there is no error in the neutral information, the CPU 30*a* permits the engine start control. Therefore, the start of the engine start operation when the transmission 4 is not in the neutral state is prevented, and the start of the engine 2 can be realized by utilizing the power of the electric motor 3 for traveling. Thus, a motor dedicated for the engine start can be omitted, and this can reduce the number of parts. Moreover, the power generated for the engine start can be prevented from being transmitted to the driving wheel.

Moreover, in the present embodiment, whether or not the transmission 4 is in the neutral state is determined by the erroneous detection determination processing by using the rotation information detector 33 that is a detector different from the transmission state detector 31. As above, whether or not the transmission 4 is in the neutral state is determined twice before the engine start control. Therefore, as compared to when whether or not the transmission 4 is in the neutral state is determined by using a single detector, the start torque generated by the electric motor 3 for the engine start can be surely prevented from being transmitted to the driving wheel 9.

Moreover, in the present embodiment, whether or not there is an error in the neutral information detected by the transmission state detector 31 is determined by using the detection result of the rotation information detector 33. In many cases, a vehicle includes a sensor related to a rotational frequency for the traveling control of the vehicle. Therefore, without adding a new part, whether or not the transmission 4 is in the neutral state can be determined separately from the gear position sensor. Thus, a sensor dedicated for examining the erroneous detection of the transmission state detector 31 can be omitted, and this can reduce the number of parts.

Moreover, in the present embodiment, the determination torque T1 is set to a value smaller than the start torque T2. Therefore, even when there is an error in the neutral information, the change in the behavior of the vehicle body by the generation of the determination torque T1 generated by the electric motor 3 can be suppressed.

Moreover, in the present embodiment, in a state where the vehicle 1 is in the stop state, the erroneous detection determination processing is performed. To be specific, the electric motor 3 generates the determination torque T1 in a state where the rotation of the output shaft 6 is in the stop state. Therefore, for example, as compared to when the determination torque is generated in a state where the vehicle 1 is moving, specifically in a state where the vehicle 1 is being moved by human power, the change in the behavior of the vehicle 1 by the generation of the determination torque is easily determined, and determination accuracy regarding whether or not there is an error in the neutral information can be improved.

Moreover, in the present embodiment, when the CPU 30*a* determines that there is an error in the neutral information, the CPU 30*a* stops the generation of the determination torque T1 generated by the electric motor 3. For example, even before the elapsed time of the control of generating the determination torque T1 by the electric motor 3 reaches the predetermined period of time or the torque applied period, the CPU 30*a* stops the electric motor 3 on condition that it is determined that the driving wheel 9 has started rotating. Therefore, the determination torque can be prevented from being continuously applied to the input shaft 5 when the transmission 4 is not in the neutral state, and this can suppress the change in the behavior of the vehicle body.

Moreover, in the present embodiment, the engine start control starts, and the generated torque of the electric motor 3 is increased from the determination torque T1 to the start torque T2 for the engine start. Therefore, the energy of the determination torque T1 can be utilized for the start of the engine 2. As compared to when the engine start control is executed from a state where the input shaft 5 is in the stop state, the energy for the engine start is effectively utilized, and a period of time until the time point of the start of the engine 2 is easily reduced.

Other Embodiments

The present disclosure is not limited to the above embodiment, and modifications, additions, and eliminations may be made with respect to the configuration of the embodiment.

When the vehicle is a motorcycle, the motorcycle may be a sport straddled vehicle including footrests at both sides of a seat or may be a scooter straddled vehicle including a footrest in front of the seat.

For example, the vehicle described in the above embodiment is a hybrid vehicle including two traveling driving sources but is not limited to this. For example, the vehicle may include only one traveling driving source or may include three or more traveling driving sources. For example, the vehicle may include only the internal combustion engine as the traveling driving source. Even in the case of such vehicle, whether or not the transmission is in the neutral state is prevented from being erroneously determined, and the engine start in which the power transmission to the output shaft is suppressed is realized. For example, when it is determined that the transmission is in the neutral state, and the engine start operation is executed, the power generated by the engine start can be prevented from being transmitted to the driving wheel regardless of the presence or absence of the main clutch or regardless of whether the main clutch is in the disengaged state or the engaged state.

In the above embodiment, the vehicle is described as a series hybrid vehicle that can travel by transmitting the rotational power, output from the engine, directly to the driving wheel. However, the vehicle is not limited to this. For example, the vehicle may be a vehicle configured such that a starter motor dedicated for the start of the engine or an ISG motor also including a power generator function transmits the power to the input shaft to rotate the input shaft. For example, the vehicle may be a so-called mild hybrid vehicle in which the output of a motor is suppressed such that the motor applies torque in a specific situation, such as during acceleration.

Moreover, in the above embodiment, the erroneous detection determination processing is executed for the engine start. However, the erroneous detection determination processing may be executed for purposes other than the engine start. Even in this case, a sensor dedicated for examining the erroneous detection of the transmission state detector can be omitted, and therefore, an effect of reducing the number of parts is obtained. Moreover, the erroneous detection of the transmission state detection can be prevented.

Moreover, in the above embodiment, the determination torque is set to torque smaller than the start torque. However, the determination torque may be torque equal to or larger than the start torque. Even in this case, it is preferable that the applied period of the determination torque T1 or the angular velocity of the input shaft be set to a value smaller than that at the time of the application of the start torque.

When a cancel condition is satisfied during the erroneous detection determination processing, such as when a cancel command of a start request by the operation of the rider is generated, the erroneous detection determination processing may terminate in the middle. For example, the cancel command may be an engagement command for the main clutch, a speed change command for changing the state of the transmission to a state other than the neutral state, an accelerator operation command, or the like. When such cancel command is generated, the erroneous detection determination processing may terminate, and vehicle start processing by the electric motor 3 may be performed. Thus, the vehicle control corresponding to the rider's intention can be realized. The cancel condition may be a condition that a side stand is put down or a condition that braking is canceled.

The order of steps may be changed as long as operations similar to the above operations of the engine are performed. For example, Step S1 in which whether or not the vehicle 1 is in the stop state is determined, Step S2 in which whether or not the main clutch 21 is in the disengaged state is determined, and Step S3 in which whether or not the neutral information has been acquired may be executed in any order or may be executed at the same time. Moreover, one or more of Steps S1, S2, and S3 may not be executed. Step S4 in which whether or not the driving wheel 9 has started rotating is determined, Step S5 in which whether or not the predetermined period of time has been elapsed is determined, and Step S6 in which whether or not the input shaft 5 is in the rotating state is determined may be executed in any order or may be executed at the same time. Moreover, one or more of Steps S4, S5, and S6 may not be executed.

Whether or not the driving wheel has started rotating and whether or not the input shaft is in the rotating state are determined separately. However, whether or not a ratio of the angular velocity of the input shaft and the angular velocity of the driving wheel is a value corresponding to a case where the transmission is not in the neutral state may be determined. Specifically, as a combination of Steps S12 and S14, whether or not the input shaft is in the rotating state may be determined regardless of a predetermined change gear ratio defined in the transmission and a power transmitting structure located downstream of the transmission. In this case, when the input shaft is not in the rotating state regardless of the predetermined change gear ratio, the CPU 30*a* may determine that there is an error in the neutral information. Moreover, when the input shaft is in the rotating state regardless of the predetermined change gear ratio, the CPU 30*a* may determine that there is no error in the neutral information.

In the erroneous detection determination processing, since there is a possibility that there is an error in not the information received from the transmission state detector 31 but the information received from the rotation information detector 33, the CPU 30*a* may determine that there is an error in the neutral information or the rotation information.

The transmission is not limited to the transmission described in the above embodiment. In the transmission, the dog rings are moved by the actuator in the axial direction. However, the transmission is not limited to this. For example, in the transmission, dog gears may be moved by the shift actuator in the axial direction. In the transmission, dog bodies that are realized by the dog rings or the dog gears and are movable in the axial direction may be fitted to not the output shaft but the input shaft. Moreover, some of the dog bodies may be fitted to the output shaft, and some other dog bodies may be fitted to the input shaft.

A linear-motion shift fork actuator may be used instead of the shift drum. The transmission state detector may detect a parameter other than the rotation angle of the shift drum. For example, the transmission state detector may detect the axial position of the shift fork or the dog body. Moreover, when the shift actuator is hydraulically driven, and the position of the dog is changed by the hydraulic pressure, the transmission state detector may detect a hydraulic state regarding the shift actuator to detect the state of the transmission.

The transmission may be a transmission that can become the neutral state where the power applied to the input shaft is prevented from being transmitted to the driving wheel. For example, the transmission may include a sub-clutch that switches between an engaged state and a disengaged state for power transmission between the output shaft and the driving wheel, in addition to a transmission main body that switches the change gear ratio. In this case, the transmission state detector transmits to the CPU the neutral information indicating that the transmission is in the neutral state where the power transmission between the input shaft and the driving wheel is cut.

In the above embodiment, the transmission 4 selects the gear stage in electrical association with the speed change operation of the rider but may select the gear stage in mechanical association with the speed change operation of the rider. For example, in the transmission 4, one of the transmission gear pairs 7 may be selected in mechanical association with the operation of the speed change operation element by the rider. For example, in the transmission, the shift drum may be rotated by the shift actuator in accordance with the speed change operation of the rider. Or, instead of the power of the shift actuator, the shift drum may be rotated by human power transmitted from the rider who performs the speed change operation. In this case, to start the erroneous detection determination processing, the informer, such as the display or the instrument panel, may display a command which urges the rider to perform the operation for changing the state of the transmission to the neutral state.

Similarly, for example, the state of the main clutch or the degree of engagement of the main clutch may be changed by the clutch actuator in accordance with the clutch operation of the rider. Or, instead of the power of the clutch actuator, the state of the main clutch or the degree of engagement of the main clutch may be changed by human power transmitted from the rider who performs the clutch operation. In this case, to start the erroneous detection determination processing, the informer, such as the display or the instrument panel, may display a command which urges the rider to perform the operation for changing the state of the main clutch to the disengaged state.

The transmission state detector is not limited to the configuration described in the above embodiment. The transmission state detector may detect the state information indicating whether or not the transmission is in the neutral state. The transmission state detector detects a selected one of the gear stages. However, the transmission state detector may detect whether the transmission is in the neutral stage or in the gear stage other than the neutral stage. The transmission state detector may be a contact/non-contact sensor that detects only the rotation angle of the shift drum 13 which corresponds to the neutral stage.

The rotation information detector is not limited to the configuration described in the above embodiment. The rotation information detector may detect the relative rotation between the input shaft and the output shaft and may include only one of the input rotation sensor 32*a* and the output rotation sensor 32*b*. For example, when the state of one of the rotating shafts can be recognized, such as when the vehicle is in the stop state, the state of the other rotating shaft may be detected, and information regarding the relative rotation may be estimated. For example, when it is clear that one of the rotating shafts is in the stop state, the rotation of the other rotating shaft may be detected. Then, whether or not there is an error in the neutral information may be determined by determining whether or not the rotation of the other rotating shaft is in a predetermined change gear ratio range. Moreover, for example, the processing circuitry may determine based only on the information received from the output rotation sensor whether or not there is an error in the neutral information. To be specific, Step S6 described above may be omitted.

The clutch state detector is not limited to the configuration described in the above embodiment. The clutch state detector may be a sensor that detects a physical quantity corresponding to the degree of engagement of the main clutch. For example, the clutch state detector may be a current sensor that detects a current flowing through a solenoid of the clutch actuator, a hydraulic sensor that detects the hydraulic pressure of the clutch actuator, or a displacement sensor that detects the displacement of members of the main clutch which contact each other.

In the above embodiment, the hydraulic actuator is described as the clutch actuator. However, the clutch actuator is not limited to this. The clutch actuator may be a different type of actuator, such as an electric motor. Moreover, in the above embodiment, the main clutch is in the disengaged state when in the natural state where the hydraulic pressure is not applied to the main clutch. However, the main clutch is not limited to this. Specifically, the main clutch may be set so as to be in the engaged state when in the natural state where the pressure is not applied to the main clutch, and become the disengaged state by the application of the pressure.

In the above embodiment, when the CPU 30*a* determines that there is no error in the neutral information, the CPU 30*a* automatically starts the engine start control. However, after the CPU 30*a* determines that there is no error in the neutral information, the CPU 30*a* may set the engine start control to a permitted state. The CPU 30*a* does not have to instantly proceed to the engine start control after the determination. In this case, in accordance with the user's operation with respect to a user interface included in the vehicle, the CPU 30*a* may start the engine start control on condition that the engine start control is in the permitted state.

When the processing circuitry determines that there is an error in the neutral information, the processing circuitry may restrict the engine start control. To be specific, in the above embodiment, when the CPU 30*a* determines that there is an error in the neutral information, the CPU 30*a* terminates the control without proceeding to the engine start control. However, even when the CPU 30*a* determines that there is an error in the neutral information, the engine start control does not have to be prohibited. For example, the erroneous detection is assumed to be performed by the rotation information detector 33, not the transmission state detector 31. In this case, when the CPU 30*a* determines that there is an error in the information, a situation where the engine start is permitted may be restricted. For example, the engine start may be permitted only when a condition that the vehicle is influenced little even when the vehicle moves at the time of the engine start is satisfied. Moreover, for example, the processing circuitry may execute the engine start when the processing circuitry determines that there is an error in the neutral information. In this case, the processing circuitry may restrict the engine start control by making the torque at an initial stage of the engine start smaller than that when the processing circuitry determines that there is no error in the neutral information. Thus, when it is determined at the initial stage of the engine start that the vehicle is moving, the movement of the vehicle can be easily prevented. Moreover, when it is determined that there is an error in the information, the engine output control may be executed in a so-called limp home state where the output of the engine is suppressed even after the engine start as compared to when it is determined that there is no error in the information.

In a method of determining an error for a transmission, a timing at which the erroneous detection determination processing is performed is not limited to a timing when the vehicle is in the stop state and may be a timing at which the vehicle is moving. For example, when it is determined by the transmission state detector 31 that the transmission is in the neutral state, but it is determined that a rotational frequency ratio between the input shaft and the driving wheel is maintained at the change gear ratio set in the transmission or the power transmitting structure, it may be determined whether or not there is an error in the state information or the rotation information.

For example, while the vehicle is traveling, driving torque for determination or braking torque for determination may be applied to the input shaft, or braking torque for determination may be applied to the output shaft. Thus, the rotation information related to the relative rotation between the input shaft and the driving wheel (output shaft) may be acquired. For example, when the neutral information is acquired from the transmission state detector 31, but the rotational frequency ratio between the input shaft and the output shaft is maintained at a predetermined change gear ratio by the application of the torque to one of the input shaft or the output shaft, it may be determined that there is an error in the state information or the rotation information. The torque applied to the input shaft may be applied by the engine, the motor, or the clutch. Moreover, the torque applied to the output shaft may be applied by traveling reaction force from a road surface or a brake controller. For example, when the vehicle is in the moving state but the transmission can be switched to the neutral state, the above-described erroneous detection determination processing or the above-described engine start processing may be executed. For example, as the situation where the vehicle is in the moving state but the transmission can be switched to the neutral state, a situation where traveling feeling is influenced little is assumed. Specific examples of such situation include an inertial traveling state and a constant traveling state in a low speed range.

In the above embodiment, the informer is a display that displays the engine start error information as the image information. However, the informer may be a speaker, a buzzer, or the like which outputs the engine start error information as sound information or may be an optical element which outputs the engine start error information as optical information.

The state information is not limited the information received by the processing circuitry of the controller 30 from an outside but may be information generated by the processing circuitry itself of the controller 30. For example, that the processing circuitry acquires the state information indicating the state of the transmission may denote that the processing circuitry generates a command value to be transmitted to the shift actuator to change the state of the transmission. For example, in the above embodiment, when the CPU 30*a* of the controller 30 generates a command value for setting the transmission 4 to the neutral state as the command value to be transmitted to the shift actuator 36, the CPU 30*a* of the controller 30 may determine in Step S3 of FIG. 2 from the command value that the transmission is in the neutral state.

In the above embodiment, the erroneous detection determination processing is executed immediately before the start control of the engine 2. However, the erroneous detection determination processing does not have to be executed immediately before the engine start control and may be executed at a predetermined timing before the engine start control. In this case, when executing the engine start control, the engine start control may be permitted on condition that in the erroneous detection determination processing executed before the start control of the engine 2, it is determined that there is no error in the neutral information. Thus, the execution of the engine start control in a state where there is an error in the neutral information can be prevented. For example, the erroneous detection determination processing may be executed at a timing at which the electric power supply to the CPU starts or an operation check timing of an electrical component mounted on the vehicle body. In this case, the CPU stores in the memory the result of the determination regarding whether or not there is an error in the neutral information, and can utilize the result when determining whether to permit the engine start control performed thereafter.

Preferably, the engine start condition may include a condition that the rider is straddling the vehicle. For example, the engine start condition may include a condition that as the detection information of a stand switch, the stand switch detects a state where the stand is put up. Thus, the execution of the engine start related control in a state where the rider is not straddling the vehicle can be prevented.

Moreover, in the step of generating the determination torque by the electric motor, the determination torque may be generated based on the information from the brake sensor while the rider is performing a braking operation. Thus, the movement of the vehicle by the application of the determination torque can be easily prevented.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems. Two blocks shown in order in each flowchart may be executed at the same time or in reverse order depending on the situation.

The functionality of the elements disclosed herein may be implemented using circuitry or processing circuitry which includes general purpose processors, special purpose processors, integrated circuits, ASICs ("Application Specific Integrated Circuits"), conventional circuitry or any combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware or processor.

Disclosed Aspects

The following aspects disclose preferred embodiments.

First Aspect

A vehicle including:

an internal combustion engine and an electric motor as traveling driving sources;

a driving wheel;

a transmission including an input shaft to which power from the internal combustion engine and the electric motor is input and an output shaft that outputs the power to the driving wheel;

a transmission state detector that detects state information related to a state of the transmission;

a rotation information detector that is included separately from the transmission state detector and detects rotation information related to relative rotation between the input shaft and the output shaft; and a controller including processing circuitry, wherein:

the processing circuitry determines whether or not the state information received from the transmission state detector is neutral information indicating that the transmission is in a neutral state where power transmission between the input shaft and the output shaft is cut;

after the processing circuitry determines that the state information is the neutral information, the processing circuitry controls the electric motor such that the electric motor generates predetermined determination torque;

the processing circuitry determines based on the rotation information received from the rotation information detector whether or not there is an error in the neutral information;

when the processing circuitry determines that there is no error in the neutral information, the processing circuitry permits engine start control of transmitting the power from the electric motor to the internal combustion engine to start the internal combustion engine; and when the processing circuitry determines that there is the error in the neutral information, the processing circuitry restricts the engine start control.

According to the above configuration, the processing circuitry determines based on the rotation information whether or not there is an error in the neutral information. When the processing circuitry determines that there is no error in the neutral information, the control circuitry permits the engine start control. Therefore, the start of the internal combustion engine can be realized by utilizing the power of the electric motor for traveling. Thus, a motor dedicated for the start of the internal combustion engine can be omitted, and this can reduce the number of parts. Moreover, whether or not there is an error in the neutral information detected by the transmission state detector is determined by using the detection result of the rotation information detector. Therefore, a sensor dedicated for examining the erroneous detection of the transmission state detector can be omitted, and this can reduce the number of parts.

Second Aspect

The vehicle according to the first aspect, wherein:

the engine start control includes controlling the electric motor such that the electric motor generates predetermined start torque; and the determination torque is set to a value smaller than the start torque.

Even when there is an error in the neutral information, the change in the behavior of the vehicle body by the generation of the determination torque generated by the electric motor can be suppressed.

Third Aspect

The vehicle according to the first or second aspect, wherein in a state where power transmission from the electric motor to the internal combustion engine is cut, the processing circuitry controls the electric motor such that the electric motor generates the determination torque.

According to the above configuration, the electric motor generates the torque in a state where the power transmission from the electric motor to the internal combustion engine is cut. Therefore, the determination torque can be set low.

Fourth Aspect

The vehicle according to any one of the first to third aspects, wherein:

in a state where the vehicle is in a stop state, the processing circuitry controls the electric motor such the electric motor generates the determination torque;

the rotation information includes input rotation information related to rotation of the input shaft and output rotation information related to rotation of the output shaft;

when the processing circuitry determines based on the output rotation information that the output shaft has started rotating, the processing circuitry determines that there is the error in the neutral information; and when the processing circuitry determines based on the output rotation information that the output shaft has not started rotating, and also determines based on the input rotation information that the input shaft has started rotating, the processing circuitry determines that there is no error in the neutral information.

According to the above configuration, in a state where the vehicle is in the stop state, the processing circuitry controls the electric motor such that the electric motor generates the determination torque. To be specific, the electric motor generates the determination torque in a state where the rotation of the output shaft is in the stop state. Therefore, for example, as compared to when the determination torque is generated in a state where the vehicle is moving, specifically in a state where the vehicle is being moved by being pushed with hands, the change in the behavior of the vehicle by the generation of the determination torque is easily determined, and the determination accuracy regarding whether or not there is an error in the neutral information can be improved.

Fifth Aspect

The vehicle according to any one of the first to fourth aspects, wherein:

the rotation information includes input rotation information related to rotation of the input shaft;

the processing circuitry counts an elapsed time since the start of the control of making the electric motor generate the determination torque;

the processing circuitry determines based on the input rotation information whether or not the input shaft has started rotating; and when the elapsed time has reached a predetermined period of time in a state where the processing circuitry does not determine that the input shaft has started rotating, the processing circuitry determines that there is the error in the neutral information.

Sixth Aspect

The vehicle according to any one of the first to fifth aspects, wherein when the processing circuitry determines that there is the error, the processing circuitry stops the generation of the determination torque by the electric motor to restrict the engine start control.

According to the above configuration, the torque can be prevented from being continuously applied to the input shaft in a state where the transmission is not in the neutral state.

Seventh Aspect

The vehicle according to any one of the first to sixth aspects, wherein:

when the processing circuitry acquires a start request of the internal combustion engine, the processing circuitry determines whether or not the state information is the neutral information; and when the processing circuitry determines that there is no error, the processing circuitry starts the engine start control and controls the electric motor such that the generated torque of the electric motor is increased from the determination torque to predetermined start torque.

According to the above configuration, the determination torque generated by the electric motor is easily utilized to start the internal combustion engine, and a period of time from when the start request of the internal combustion engine is acquired until the internal combustion engine starts is easily reduced.

Eighth Aspect

The vehicle according to any one of the first to seventh aspects, further including a main clutch that is switchable between an engaged state and a disengaged state, the engaged state being a state where a power transmitting path between the internal combustion engine and the input shaft is established, the disengaged state being a state where the power transmitting path is cut, wherein:

the processing circuitry determines whether the main clutch is in the engaged state or the disengaged state; and when the processing circuitry determines that the main clutch is in the disengaged state, and also determines that the state information is the neutral information, the processing circuitry controls the electric motor such that the electric motor generates the determination torque.

According to the above configuration, the electric motor generates the determination torque in a state where the main clutch is in the disengaged state. Therefore, the determination torque can be set low, and the input shaft can be prevented from hardly rotating due to the resistance of the engine.

Ninth Aspect

A method of determining an error for a transmission including an input shaft to which power is input from a driving source and an output shaft that outputs the power to a driving wheel, the method including: by processing circuitry, acquiring state information indicating a state of the transmission;

determining whether or not the state information is neutral information indicating that the transmission is in a neutral state where power transmission between the input shaft and the driving wheel is cut;

when the processing circuitry determines that the state information is the neutral information, acquiring rotation information related to relative rotation between the input shaft and the output shaft by torque applied to the input shaft or the output shaft; and determining based on the rotation information whether or not there is an error in any one of the state information and the rotation information.

According to the above method, whether or not there is an error in the acquired neutral information is determined by using the rotation information related to the relative rotation between the input shaft and the output shaft. Therefore, a sensor dedicated for examining the erroneous detection of the transmission state detector can be omitted, and this can reduce the number of parts.

Moreover, the following aspects are also preferred.

Tenth Aspect

The vehicle according to any one of the first to eighth aspects, further including:

a main clutch that is switchable between an engaged state and a disengaged state, the engaged state being a state where a power transmitting path between the internal combustion engine and the input shaft is established, the disengaged state being a state where the power transmitting path is cut; and a clutch actuator that operates the main clutch, wherein the engine start control includes controlling the electric motor such that the generated torque of the electric motor is increased to the start torque, determining based on the input rotation information whether or not a rotational speed of the input shaft is a start threshold or more, and when the processing circuitry determines that the rotational speed of the input shaft is the start threshold or more, controlling the clutch actuator such that the main clutch is switched from the disengaged state to the engaged state.

According to the above configuration, as compared to when the electric motor generates the determination torque in a state where the main clutch is in the engaged state, the rotational frequency of the input shaft is easily increased.

Eleventh Aspect

The vehicle according to any one of the first to eighth and tenth aspects, further including:

a main clutch that is switchable between an engaged state and a disengaged state, the engaged state being a state where a power transmitting path between the internal combustion engine and the input shaft is established, the disengaged state being a state where the power transmitting path is cut; and a clutch actuator that operates the main clutch, wherein:

after the internal combustion engine is started by the engine start control, the processing circuitry controls the clutch actuator such that the main clutch switches from the engaged state to the disengaged state; and after the main clutch switches from the engaged state to the disengaged state, the processing circuitry controls the electric motor such that the rotation of the input shaft is stopped.

According to the above configuration, undesired rotation of the input shaft can be prevented.

From the foregoing description, numerous modifications and other embodiments of the present disclosure are obvious to those skilled in the art. Accordingly, the foregoing description is to be construed as illustrative only, and is provided for the purpose of teaching those skilled in the art the best mode for carrying out the present disclosure. The structural and/or functional details may be substantially modified without departing from the scope of the present disclosure.

What is claimed is:

1. A vehicle comprising:

an internal combustion engine and an electric motor as traveling driving sources;

a driving wheel;

a transmission including:

an input shaft to which power from the internal combustion engine and the electric motor is input, and an output shaft configured to output the power to the driving wheel;

a transmission state detector configured to detect state information related to a state of the transmission;

a rotation information detector separate from the transmission state detector and configured to detect rotation information related to relative rotation between the input shaft and the output shaft;

a clutch configured to be switchable between an engaged state, in which a power transmitting path between the internal combustion engine and the input shaft is established, and a disengaged state, in which the power transmitting path is cut; and a controller including processing circuitry, wherein the processing circuitry is configured to:

determine whether or not the state information received from the transmission state detector is neutral information indicating that the transmission is in a neutral state where power transmission between the input shaft and the output shaft is cut;

after the processing circuitry determines that the state information is the neutral information, control the electric motor such that the electric motor generates predetermined determination torque;

determine, based on the rotation information received from the rotation information detector, whether or not there is an error in the neutral information;

when the processing circuitry determines that there is no error in the neutral information, permit engine start control of transmitting the power from the electric motor to the internal combustion engine to start the internal combustion engine; and when the processing circuitry determines that there is the error in the neutral information, restrict the engine start control, wherein the input shaft is connected to the electric motor such that the power from the electric motor is input to the input shaft in both the engaged state and the disengaged state of the clutch; and wherein the processing circuitry is further configured to, in a state in which the clutch has cut power transmission from the electric motor to the internal combustion engine, control the electric motor such that the electric motor generates the determination torque.

2. The vehicle according to claim 1, wherein:

the engine start control includes controlling the electric motor such that the electric motor generates predetermined start torque; and the determination torque is set to a value smaller than the start torque.

3. The vehicle according to claim 1, wherein:

the processing circuitry is further configured to, in a state in which the vehicle is in a stop state, control the electric motor such the electric motor generates the determination torque;

the rotation information includes input rotation information related to rotation of the input shaft and output rotation information related to rotation of the output shaft;

the processing circuitry is further configured to, when the processing circuitry has determined based on the output rotation information that the output shaft has started rotating, determine that there is the error in the neutral information; and the processing circuitry is further configured to, when the processing circuitry has determined based on the output rotation information that the output shaft has not started rotating, and has also determined based on the input rotation information that the input shaft has started rotating, determine that there is no error in the neutral information.

4. The vehicle according to claim 1, wherein the rotation information includes input rotation information related to rotation of the input shaft, and the processing circuitry is further configured to:

count an elapsed time since the start of the control of making the electric motor generate the determination torque;

determine based on the input rotation information whether or not the input shaft has started rotating; and when the elapsed time has reached a predetermined period of time in a state where the processing circuitry does not determine that the input shaft has started rotating, determine that there is the error in the neutral information.

5. The vehicle according to claim 1, wherein the processing circuitry is further configured to, when the processing circuitry determines that there is the error, stop the generation of the determination torque by the electric motor to restrict the engine start control.

6. The vehicle according to claim 1, wherein the processing circuitry is further configured to:

when the processing circuitry acquires a start request of the internal combustion engine, determine whether or not the state information is the neutral information; and when the processing circuitry determines that there is no error, start the engine start control and control the electric motor such that the generated torque of the electric motor is increased from the determination torque to predetermined start torque.

7. The vehicle according to claim 1, wherein the processing circuitry is further configured to:

determine whether the main clutch is in the engaged state or the disengaged state; and when the processing circuitry determines that the main clutch is in the disengaged state, and also determines that the state information is the neutral information, control the electric motor such that the electric motor generates the determination torque.

8. The vehicle according to claim 1, wherein:

the rotation information detector includes an output rotation sensor configured to detect a rotational speed of the output shaft; and the processing circuitry is further configured to, after the processing circuitry determines based on output rotation information received from the output rotation sensor that the vehicle is in a stop state, cause the electric motor to generate the determination torque.

9. The vehicle according to claim 1, wherein the processing circuitry is further configured to, when the processing circuitry determines whether or not there is the error:

count an elapsed time since the processing circuitry has caused the electric motor to generate the determination torque, and when the elapsed time reaches a predetermined period of time, and the processing circuitry determines based on the rotation information that the input shaft is not in a rotating state, determine that there is the error in the neutral information.

10. The vehicle according to claim 1, wherein the processing circuitry is further configured to, when the processing circuitry determines whether or not there is the error:

count an elapsed time since the processing circuitry has caused the electric motor to generate the determination torque, when the elapsed time reaches a predetermined period of time, and the processing circuitry determines based on the rotation information that the input shaft is not in a rotating state, determine that there is the error in the neutral information, and when the processing circuitry determines based on the rotation information that the output shaft has rotated before the elapsed time reaches the predetermined period of time, determine that there is the error in the neutral information.

11. The vehicle according to claim 1, wherein the processing circuitry is further configured to, when the processing circuitry determines whether or not there is the error:

count an elapsed time since the processing circuitry has caused the electric motor to generate the determination torque, when the elapsed time reaches a predetermined period of time, and the processing circuitry determines based on the rotation information that the input shaft is not in a rotating state, determine that there is the error in the neutral information, and when the processing circuitry determines based on the rotation information that the output shaft does not rotate and the input shaft is in the rotating state before the elapsed time reaches the predetermined period of time, determine that there is no error in the neutral information.

12. The vehicle according to claim 1, wherein the processing circuitry is further configured to, when the processing circuitry determines whether or not there is the error:

count an elapsed time since the processing circuitry has caused the electric motor to generate the determination torque, when the elapsed time reaches a predetermined period of time, and the processing circuitry determines based on the rotation information that the input shaft is not in a rotating state, determine that there is the error in the neutral information, when the processing circuitry determines based on the rotation information that the output shaft has rotated before the elapsed time reaches the predetermined period of time, determine that there is the error in the neutral information, and when the processing circuitry determines based on the rotation information that the output shaft does not rotate and the input shaft is in the rotating state before the elapsed time reaches the predetermined period of time, determine that there is no error in the neutral information.

13. A method of determining an error for a transmission including an input shaft to which power is input from a driving source and an output shaft that outputs the power to a driving wheel, the method comprising: using processing circuitry:

acquiring state information indicating a state of the transmission;

determining whether or not the state information is neutral information indicating that the transmission is in a neutral state where power transmission between the input shaft and the driving wheel is cut;

in response to determining that the state information is the neutral information, acquiring rotation information related to relative rotation between the input shaft and the output shaft by determination torque applied to the input shaft or the output shaft; and determining based on the rotation information whether or not there is an error in any one of the state information and the rotation information, the determining of whether or not there is an error in any one of the state information and the rotation information comprising:

counting an elapsed time since the determination torque is applied;

determining that there is the error in the state information as the neutral information in response to determining, based on the rotation information, that the input shaft is not in a rotating state even when the elapsed time has reached a predetermined period of time;

determining that there is the error in the state information as the neutral information in response to determining, based on the rotation information, that the output shaft has rotated before the elapsed time reaches the predetermined period of time; and determining that there is no error in the state information as the neutral information in response to determining, based on the rotation information, that the output shaft does not rotate and the input shaft is in the rotating state before the elapsed time reaches the predetermined period of time.

* * * * *